United States Patent
Lee et al.

(10) Patent No.: US 9,049,600 B2
(45) Date of Patent: *Jun. 2, 2015

(54) MOBILE TERMINAL AND OPERATION CONTROL METHOD THEREOF

(71) Applicant: LG Electronics Inc., Seoul (KR)

(72) Inventors: Jungsu Lee, Seoul (KR); Jinwook Choi, Seoul (KR); Seungwon Lee, Seoul (KR); Seungcheon Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/444,536

(22) Filed: Jul. 28, 2014

(65) Prior Publication Data

US 2014/0333566 A1  Nov. 13, 2014

Related U.S. Application Data

(63) Continuation of application No. 14/093,346, filed on Nov. 29, 2013, now Pat. No. 8,831,688, which is a continuation of application No. 13/691,328, filed on Nov. 30, 2012, now Pat. No. 8,639,297, which is a continuation of application No. 13/203,908, filed as application No. PCT/KR2010/006237 on Sep. 13, 2010, now Pat. No. 8,489,150.

(51) Int. Cl.
*H04W 88/02* (2009.01)
*H04W 12/08* (2009.01)
(Continued)

(52) U.S. Cl.
CPC ............... *H04W 12/08* (2013.01); *H04M 1/67* (2013.01); *H04M 2250/22* (2013.01); *H04W 4/001* (2013.01); *H04W 4/008* (2013.01); *H04W 4/025* (2013.01); *G06F 1/3231* (2013.01); *G06F 3/013* (2013.01); *H04W 52/0254* (2013.01); *H04W 52/027* (2013.01); *H04M 2250/12* (2013.01); *H04M 2250/52* (2013.01); *H04W 88/02* (2013.01); *G06F 3/005* (2013.01); *G06F 1/1694* (2013.01); *Y02B 60/1289* (2013.01)

(58) Field of Classification Search
CPC ....................... H04M 1/72519; G06K 9/00604
USPC ............... 455/566, 550.1, 556.1, 569.1, 90.1, 455/411, 418, 67.11, 556.2; 340/571
See application file for complete search history.

(56) References Cited

U.S. PATENT DOCUMENTS 6,401,209 B1  6/2002  Klein
6,665,805 B1  12/2003  Tsirkel et al.
(Continued)

FOREIGN PATENT DOCUMENTS

CN  101159010 A  4/2008
EP  2 096 624 A1  9/2009
(Continued)

*Primary Examiner* — John J Lee
(74) *Attorney, Agent, or Firm* — Birch, Stewart, Kolasch & Birch, LLP

(57) ABSTRACT

Discussed is a mobile terminal, including a touch screen configured to display visual information, a camera unit configured to detect user's gaze information and a controller configured to execute an application in response to a user input, wherein an execution screen of the application is displayed on the touch screen, detect the user's gaze information, and stop displaying the execution screen of the application based on an elapsed time from when the user's gaze information is not detected, wherein the elapsed time is varied based on a type of the application.

24 Claims, 11 Drawing Sheets

(51) Int. Cl.
  *H04M 1/67* (2006.01)
  *H04W 4/00* (2009.01)
  *G06F 1/32* (2006.01)
  *G06F 3/01* (2006.01)
  *G06F 3/00* (2006.01)
  *G06F 1/16* (2006.01)
  *H04W 4/02* (2009.01)
  *H04W 52/02* (2009.01)

(56) References Cited

U.S. PATENT DOCUMENTS

| | | | |
|---|---|---|---|
| 6,734,845 B1 | 5/2004 | Nielsen et al. | |
| 7,091,471 B2 | 8/2006 | Wenstrand et al. | |
| 7,636,456 B2* | 12/2009 | Collins et al. | 382/118 |
| 2005/0193144 A1 | 9/2005 | Hassan et al. | |
| 2005/0198661 A1 | 9/2005 | Collins et al. | |
| 2005/0289363 A1 | 12/2005 | Tsirket et al. | |
| 2006/0110008 A1* | 5/2006 | Vertegaal et al. | 382/103 |
| 2007/0078552 A1* | 4/2007 | Rosenberg | 700/94 |
| 2007/0150842 A1 | 6/2007 | Chaudhri et al. | |
| 2008/0050022 A1 | 2/2008 | Okada et al. | |
| 2008/0118152 A1 | 5/2008 | Thorn et al. | |
| 2008/0303443 A1 | 12/2008 | Tran et al. | |
| 2009/0082066 A1* | 3/2009 | Katz | 455/566 |
| 2010/0005523 A1 | 1/2010 | Hassan et al. | |
| 2010/0042827 A1 | 2/2010 | Pratt et al. | |
| 2010/0079508 A1 | 4/2010 | Hodge et al. | |
| 2010/0259387 A1 | 10/2010 | Jiang | |
| 2011/0256848 A1* | 10/2011 | Bok et al. | 455/411 |

FOREIGN PATENT DOCUMENTS

| | | |
|---|---|---|
| KR | 2002-0093426 A | 12/2002 |
| KR | 10-2004-0026560 A | 3/2004 |
| KR | 10-2006-0044206 A | 5/2006 |
| KR | 10-2010-0053144 A | 5/2010 |

* cited by examiner

MOBILE TERMINAL AND OPERATION CONTROL METHOD THEREOF

CROSS REFERENCE TO RELATED APPLICATIONS

This application is a Continuation of U.S. application Ser. No. 14/093,346 filed on Nov. 29, 2013, which is a Continuation of U.S. application Ser. No. 13/691,328 filed on Nov. 30, 2012 (now U.S. Pat. No. 8,639,297), which is a Continuation of U.S. application Ser. No. 13/203,908 filed on Aug. 30, 2011 (now U.S. Pat. No. 8,489,150), which is the national phase of PCT International Application No. PCT/KR2010/006237 filed on Sep. 13, 2010. The contents of all of these applications are hereby incorporated by reference as fully set forth herein in their entirety.

BACKGROUND OF THE INVENTION

1. Field of the Invention

The present disclosure relates to a mobile terminal and an operation control method thereof, and more particularly, to a mobile terminal for controlling the execution of screen lock, and a method for controlling the execution of screen lock provided in such a mobile terminal.

2. Discussion of the Related Art

In recent years, as a mobile terminal provides complicated and various functions, considerations are required for the convenience of a user interface (UI) including a screen lock function, and the like.

SUMMARY OF THE INVENTION

A technical task of the present invention is to provide a mobile terminal and an operation control method thereof in which a delay time of the screen lock execution is controlled according to the type of application, thereby improving the inconvenience of a user interface and effectively managing a battery according to an interrupt when required to continuously receive an input from the user or continuously provide visual information to the user.

In addition, another technical task of the present invention is to provide a mobile terminal and an operation control method thereof in which a delay time of the screen lock execution is controlled according to the user's gaze information, thereby improving the inconvenience of a user interface and effectively managing a battery according to an interrupt when required to continuously receive an input from the user or continuously provide visual information to the user.

In order to solve the foregoing technical task, it is characterized in that a mobile terminal may include an input unit configured to receive a user input; an execution controller configured to execute screen lock if the user input is not received for a predetermined time; and a change controller configured to change the predetermined time based on a type of application.

According to an embodiment, it is characterized in that the change controller may reduce or extend the predetermined time based on the type of application.

Furthermore, according to an embodiment, it is characterized in that the application may include a content-based application, and the change controller may change the predetermined time based on reproduction information of content. Furthermore, according to an embodiment, it is characterized in that the application may include a search-based application, and the change controller may change the predetermined time based on an input time or search time of search word.

Furthermore, according to an embodiment, it is characterized in that the application may include a messaging service-based application, and the change controller may change the predetermined time based on an input time of message.

Furthermore, according to an embodiment, it is characterized in that the application may include a location information-based application, and the change controller may change the predetermined time based on a change of location information. Furthermore, according to an embodiment, it is characterized in that the application may include a time information-based application, and the change controller may change the predetermined time based on a change of time information.

Furthermore, according to an embodiment, it is characterized in that the change controller may change the predetermined time based on a security setting for an object approached by the application. Furthermore, according to an embodiment, it is characterized in that the change controller may change the predetermined time based on an interrupt generated by the application.

On the other hand, in order to solve the foregoing technical task, it is characterized in that a method of controlling the operation of a mobile terminal may include checking a type of application; changing a predetermined time based on the type of application; and executing screen lock when a user input is not received for the predetermined time or a time to which the predetermined time has been changed.

On another hand, in order to solve the foregoing another technical task, it is characterized in that a mobile terminal may include an input unit configured to receive a user input; at least one sensor configured to detect user's gaze information; an execution controller configured to execute screen lock if the user input is not received for a predetermined time; and a change controller configured to change the predetermined time based on the user's gaze information.

According to an embodiment, it is characterized in that the at least one sensor may include at least one acceleration sensor for detecting tilt of the mobile terminal and/or at least one touch sensor for detecting a grip type of the mobile terminal. Furthermore, according to an embodiment, it is characterized in that the at least one sensor may include at least one optical sensor for capturing the user.

Furthermore, according to an embodiment, it is characterized in that the change controller may reduce or extend the predetermined time based on the user's gaze information.

Furthermore, according to an embodiment, it is characterized in that the mobile terminal may further include a display unit for displaying visual information, wherein the change controller determines whether the user gazes at the visual information or a gaze time for the visual information based on the gaze information, and changes the predetermined time based on whether to gaze or the gaze time. Furthermore, according to an embodiment, it is characterized in that the change controller may change the predetermined time based on a type of application, and the type of application may be classified according to whether the user's gaze at the visual information is required.

Furthermore, according to an embodiment, it is characterized in that the gaze information may include tilt of the mobile terminal and/or the user's grip type of the mobile terminal. Furthermore, according to an embodiment, it is characterized in that the change controller may change the predetermined time further based on the user's application execution pattern or screen lock release pattern. Furthermore, according to an embodiment, it is characterized in that the gaze information may include information on whether a face region is detected on an image in which the user has been captured.

On another hand, in order to solve the foregoing another technical task, it is characterized in that a method of controlling the operation of a mobile terminal may include detecting user's gaze information; changing a predetermined time based on the user's gaze information; and executing screen lock when a user input is not received for the predetermined time or a time to which the predetermined time has been changed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

A screen lock function typically provided in the mobile terminal is a useful function in the aspect of saving battery and user security. For example, if the user does not apply an input to the mobile terminal for a predetermined time, then screen lock will be carried out, thereby allowing the mobile terminal to enter a screen lock mode. In a screen lock mode, if the user does not apply a preset input to the mobile terminal, then any other input cannot be provided to the mobile terminal. In a screen lock mode, furthermore, the mobile terminal may display a preset screen in the screen lock mode instead of the screen associated with a function being executed just prior to entering the screen lock mode. Accordingly, the mobile terminal 100 may save battery power consumed while continuously waiting for a user input or displaying visual information, thereby preventing any other person's use without permission that can happen while the user does not occupy the mobile terminal.

Hereinafter, a mobile terminal associated with according to an embodiment of the present disclosure will be described in more detail with reference to the accompanying drawings. A suffix "module" or "unit" used for constituent elements used in the following description is merely intended for easy description of the specification, and the suffix itself does not give any special meaning or function.

Figure 1:
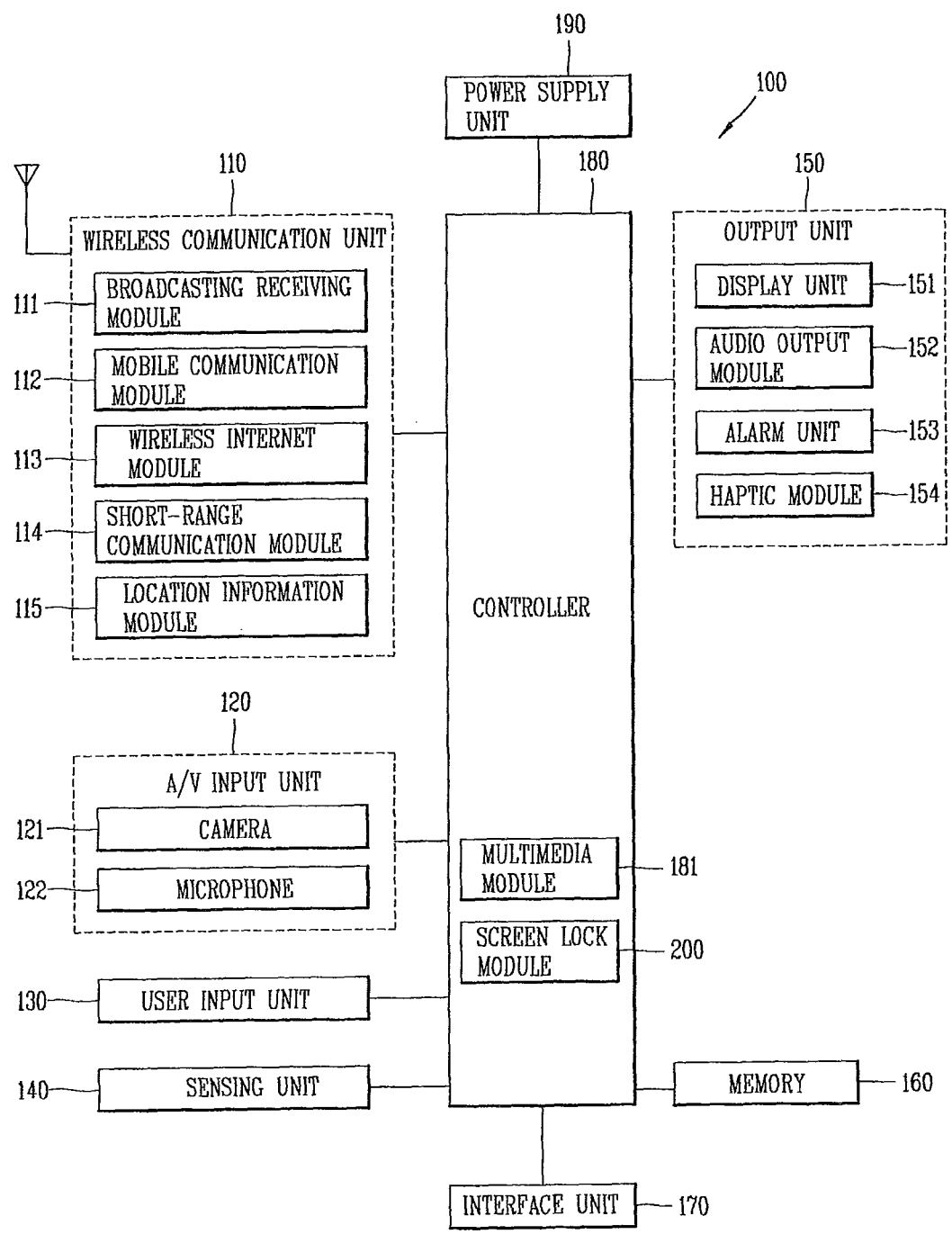
FIG. 1 is a block diagram illustrating a mobile terminal associated with an embodiment of the present disclosure.

FIG. 1 is a block diagram illustrating a mobile communication terminal associated with an embodiment of the present invention.

The mobile communication terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile communication terminal may be implemented with greater or less number of elements than those illustrated elements. Hereinafter, the constituent elements will be described in sequence.

The wireless communication unit 110 typically includes one or more elements allowing radio communication between the mobile communication terminal 100 and a wireless communication system, or allowing radio communication between radio communication the mobile communication terminal 100 and a network in which the mobile communication terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile communication terminal 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112. The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113 means a module for supporting wireless Internet access. The wireless Internet module 113 may be built-in or externally installed to the mobile communication terminal 100. Here, it may be used a wireless Internet access technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 114 is a module for supporting a short-range communication. Here, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile communication terminal, and there is a GPS module as a representative example.

Referring to FIG. 1, the A/V (audio/video) input unit 120 receives an audio or video signal, and the A/V (audio/video) input unit 120 may include a camera 121 and a microphone 122. The camera 121 processes a image frame, such as still picture or video, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the use environment of the mobile communication terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile communication terminal 100 such as an opened or closed status of the mobile communication terminal 100, a location of the mobile communication terminal 100, an orientation of the mobile communication terminal 100, and the like, and generates a sensing signal for controlling the operation of the mobile communication terminal 100. For example, when the mobile communication terminal 100 is a slide phone type, it may sense an opened or closed status of the slide phone. Furthermore, the sensing unit 140 takes charge of a sensing function associated with whether or not power is supplied from the power supply unit 190, or whether or not an external device is coupled to the interface unit 170. On the other hand, the sensing unit 140 may include a proximity sensor 141.

The output unit 150 is configured to provide an output for audio signal, video signal, or alarm signal, and the output unit 150 may include the display unit 151, an audio output module 152, an alarm unit 153, a haptic module 154, and the like.

The display unit 151 may display(output) information processed in the mobile communication terminal 100. For example, when the mobile communication terminal 100 is in a phone call mode, the display unit 151 may display a User Interface (UI) or a Graphic User Interface (GUI) associated with a call. When the mobile communication terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a terminal body through a region occupied by the display unit 151 of the terminal body.

The display unit 151 may be implemented in two or more in number according to a configured aspect of the portable terminal 100. For instance, a plurality of the display units 151 may be arranged on one surface to be spaced apart from or integrated with each other, or may be arranged on different surfaces.

Here, if the display unit 151 and a touch sensitive sensor (referred to as a touch sensor) have an interlayer structure, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the portable terminal 100 covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., proximity touch distance, proximity touch direction, proximity touch speed, time, proximity touch position, proximity touch moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the portable terminal 100, e.g., sound alarming a call received or a message received, and so on. The audio output module 152 may include a receiver, a speaker, a buzzer, and so on.

The alarm 153 outputs signals notifying occurrence of events from the portable terminal 100. The events occurring from the portable terminal 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user's direct contact, or a user's muscular sense using a finger or a hand. The haptic module 154 may be implemented in two or more in number according to the configuration of the portable terminal 100.

The memory 160 may store a program for processing and controlling the controller 180. Alternatively, the memory 160 may temporarily store input/output data (e.g., phonebook data, messages, audios, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile communication terminal 100 may operate a web storage which performs the storage function of the memory 160 on the Internet.

The interface unit 170 may generally be implemented to interface the portable terminal with external devices. The interface unit 170 may allow a data reception from an external device, a power delivery to each component in the portable terminal 100, or a data transmission from the portable terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like. The identification module may be configured as a chip for storing various information required to authenticate an authority to use the portable terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the portable terminal 100 via a port.

Also, the interface unit may serve as a path for power to be supplied from an external cradle to the portable terminal 100 when the portable terminal 100 is connected to the external cradle or as a path for transferring various command signals inputted from the cradle by a user to the portable terminal 100. Such various command signals or power inputted from the cradle may operate as signals for recognizing that the portable terminal 100 has accurately been mounted to the cradle.

The controller 180 typically controls the overall operations of the portable terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 provides power required by various components under the control of the controller 180.

On the other hand, according to the embodiments of the present disclosure, the controller 180 may include a screen lock module 200. The screen lock module 200 will be described in detail with reference to FIG. 2.

On the other hand, according to an embodiment of the present disclosure, the sensing unit 140 may include at least one sensor for detecting the user's gaze information. The at least one sensor may include at least one acceleration sensor for detecting tilt of the mobile terminal 100. The acceleration sensor may measure the acceleration of gravity for earth's gravity to measure a degree of the mobile terminal 100 being inclined to the surface of the earth. The acceleration sensor may detect an inclined degree of the mobile terminal 100 against a single axis (x, y, or z-axis) or multiple axes (at least two axes among x, y, and z).

Furthermore/otherwise, the at least one sensor may include at least one touch sensor for detecting a grip type of the mobile terminal. The at least one touch sensor may be a lateral surface touch sensor, and the lateral surface touch sensor may be provided at a left/right lateral surface of the mobile terminal or both lateral surfaces thereof. Each lateral surface touch sensor may include a plurality of cells for recognizing one touch as an input, and the plurality of cells may be arranged in a grid form. If the user's finger is touched to some cells of the plurality of cells through a lateral surface touch, then the user's grip type may be determined by a combination of some cells touched with the user's finger.

Furthermore, at least one sensor may include at least one optical sensor for capturing a user's face. The optical sensor may be located at the same surface as the surface provided with the display unit 151 to capture the user. In this case, a user's face region may be detected from an image in which the user has been captured. For example, the controller 180 may detect a user's face region from the captured image through an edge extraction, pattern extraction, or the like.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

Figure 2:
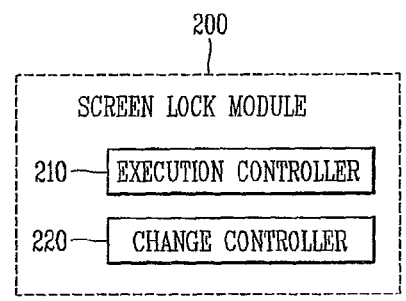
FIG. 2 is a detailed block diagram illustrating a screen lock module 200 illustrated in FIG. 1.

FIG. 2 is a detailed block diagram illustrating a screen lock module 200 illustrated in FIG. 1.

The screen lock module 200 according to the embodiments of the present disclosure may include an execution controller 210 and a change controller 220. If a user input is not received through the user input unit 130 for a preset time (delay time), then the execution controller 210 may execute screen lock. For example, when the user of the mobile terminal 100 does not apply a user input for a delay time through the user input unit 130, the execution controller 210 may execute screen lock. In this case, the mobile terminal 100 enters a screen lock mode, and the user may apply a preset input in the screen lock mode to get out of the screen lock mode.

The change controller 220 according to a first embodiment of the present disclosure may change a delay time based on a type of application. Here, the type of application may mean an attribute of the application divided according to a function provided by the application. According to an embodiment, the type of application may be divided according to the kinds of data being approached, used or inputted in the application, such as content-based, messaging service-based, search-based, location information-based, time information-based, and the like.

For example, the type of application may be stored in the mobile terminal 100 and checked from the registration information of the application managed by an operating system. The registration information of the application may include an ID for identifying the application, a name of the application, and the like. If an application is executed, for example, then the change controller 220 may determine and check the type of application based on the name of the application from the registration information of the application.

Otherwise, the type of application may be checked from the registration information of the application stored in the mobile terminal 100 and independently managed by an operating system. In this case, the registration information of the application may include an ID for identifying the application, a name of the application, a type of the application, and the like. If an application is executed, for example, then the change controller 220 may determine and check the type of application from the registration information of the application.

Furthermore, the change controller 220 may change a delay time based on the checked type of application. In this case, the change controller 220 may reduce or extend a delay time based on the checked type of application.

For example, if a user input is not received for T seconds, then screen lock may be carried out by the execution controller 210. In this case, for the type of application being executed, if an input of information may be delayed as in the writing of a message or a display of information may be delayed as in the searching for data, then the change controller 220 may change the delay time from T to 2T seconds, for example. Accordingly, the execution controller 210 may not execute screen lock even when T seconds have passed, but may execute screen lock when a user input is not received until 2T seconds have passed.

Otherwise, for the type of application being executed, if an input or display of information is unnecessary or at least is not delayed as in case of being executed on a background, then the change controller 220 may change the delay time from T to 0.5T second, for example. Accordingly, the execution controller 210 may execute screen lock without waiting until T seconds have passed if a user input is not received until 0.5T second has passed.

The change controller 220 according to a second embodiment of the present disclosure may change a delay time based on the user's gaze information. Here, the gaze information may mean a line connecting a user's eye to the display unit 151 or visual information displayed on the display unit 151. The change controller 220 may determine whether the user stares at the display unit 151 or visual information displayed on the display unit 151 based on the gaze information. Furthermore, the change controller 220 may determine the user's stare time at the display unit 151 or visual information displayed on the display unit 151 based on the gaze information.

According to an embodiment, if a user's input is applied through the user input unit 130 or visual information is continuously displayed through the display unit 151, then tilt of the mobile terminal and/or the user's grip type of the mobile terminal may form a predetermined pattern. For example, a situation requiring a user input such as the writing of a message, a situation requiring a display of visual information such as the reproduction of an image, and a situation where the user merely possesses the mobile terminal 100 or puts it in his or her pocket may be distinguished by tilt of the mobile terminal 100 or the user's grip type of the mobile terminal 100. In this case, if the tilt of the mobile terminal 100 or the user's grip type of the mobile terminal 100 corresponds to a predetermined pattern, then the change controller 220 may determine it as a state in which the user stares at the display unit 151 or visual information displayed on the display unit 151.

Otherwise, if a user's input is applied through the user input unit 130 or visual information is continuously displayed through the display unit 151, then the user's face region may be detected on an image in which the user has been captured through an optical sensor provided at the same surface as the surface provided with the display unit 151. For example, a situation requiring a user input such as the writing of a message, a situation requiring a display of visual information such as the reproduction of an image, and a situation where the user approaches the mobile terminal 100 to his or her ear or puts it in his or her pocket may be distinguished by the user's face region detected on an image in which the user has been captured. In this case, if a face region is detected on a captured image of the mobile terminal 100, then the change controller 220 may determine it as a state in which the user stares at the display unit 151 or visual information displayed on the display unit 151.

Furthermore, the change controller 220 may change a delay time based on the user's gaze information. In this case, the change controller 220 may reduce or extend the delay time based on the user's gaze information.

For example, if a user input is not received for T seconds, then screen lock may be executed by the execution controller 210. If it is determined that the user stares at the display unit 151 or visual information displayed on the display unit 151, then the change controller 220 may change the delay time from T to 2T seconds, for example. Accordingly, the execution controller 210 may not execute screen lock even when T seconds have passed, but may execute screen lock when a user input is not received until 2T seconds have passed.

Furthermore, if it is determined that the user does not stare at the display unit 151 or visual information displayed on the display unit 151, then the change controller 220 may change the delay time from T to 0.5 T second, for example. Accordingly, the execution controller 210 may execute screen lock without waiting until T seconds have passed if a user input is not received until 0.5T second has passed.

As a result, the execution of screen lock may be advanced or delayed according to the type of application or the user's gaze information, and the execution of screen lock by the controller 180 may be managed in a flexible manner, thereby reducing inconvenience due to an interrupt that can be generated during the user's input or display of the mobile terminal 100, as well as enhancing the effectiveness of a battery.

Figure 3:
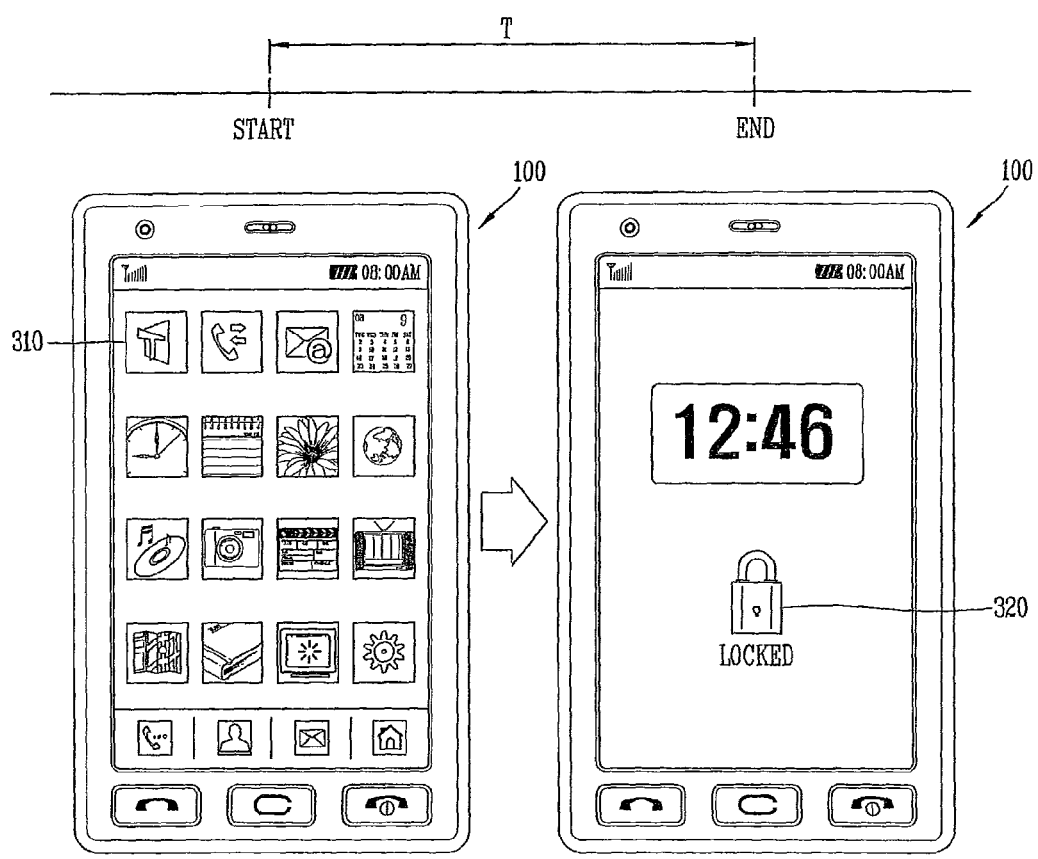
FIG. 3 is a view for describing a delay time for screen lock execution according to an embodiment of the present disclosure.

FIG. 3 is a view for describing a delay time for screen lock execution according to an embodiment of the present disclosure.

If a user input is not received for a delay time, then the execution controller 210 may execute screen lock. For example, if there is no application being executed on a foreground in the mobile terminal 100, then an idle screen may be displayed on the display unit 151. An object 310 set to call a function provided by the mobile terminal 100 may be displayed on the idle screen.

Referring to FIG. 3, for example, a time at which all applications being executed on a foreground are terminated to display an idle screen on the display unit 151 may be START. The execution controller 210 counts a time until a user input such as an input for selecting the object 310 is received from the user, for example. If the user input is not received until a preset T seconds have passed, in other words, until the time is END, then the execution controller 210 may execute screen lock. Accordingly, the idle screen may be switched to a preset screen including an item 320 indicating screen lock.

Figure 4:
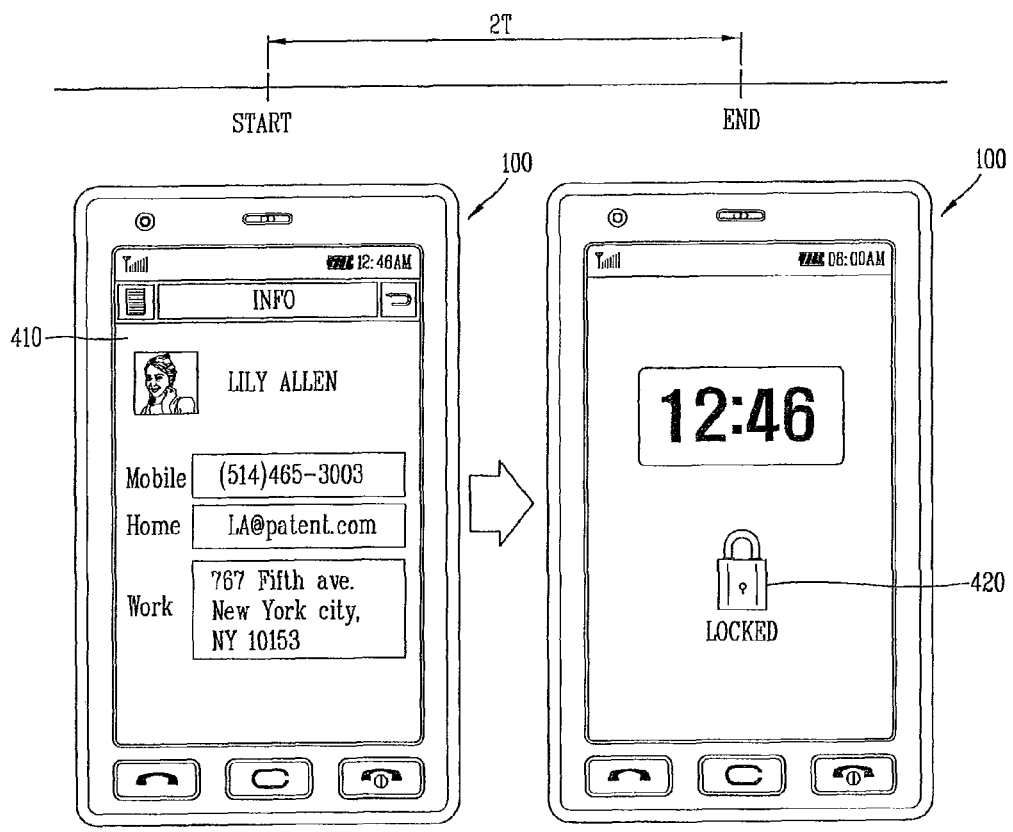
FIG. 4 is a view for describing the change of a delay time for screen lock execution according to an embodiment of the present disclosure.

FIG. 4 is a view for describing the change of a delay time for screen lock execution according to an embodiment of the present disclosure.

The change controller 220 may change a delay time based on the type of application. Here, the change controller 220 may reduce or extend a delay time based on the type of application.

Referring to FIG. 4, for example, a time when a phone book is executed in the mobile terminal 100 and contact information 410 is displayed on the display unit 151 of the mobile terminal 100 may be START. In this case, the change controller 220 may check the type of application. The execution controller 210, for example, counts a time until a user input such as an input for terminating the display of contact information is received from the user.

The change controller 220 may change a delay time, T seconds, based on the type of application. If a delay time of screen lock execution corresponding to the type of application is 2T, then the change controller 220 may change the delay time of screen lock execution that can be approached by the execution controller 210 from T to 2T. Accordingly, a display screen of the contact information 410 may be switched to a preset screen including an item 420 indicating screen lock after 2T has passed by the execution controller 210.

Otherwise, if a delay time of screen lock execution corresponding to the type of application is 0.5T, then the change controller 220 may change the delay time of screen lock execution that can be approached by the execution controller 210 from T to 0.5T. Accordingly, a display screen of the contact information 410 may be switched to a preset screen including an item 420 indicating screen lock after 0.5T has passed by the execution controller 210.

Figure 5:
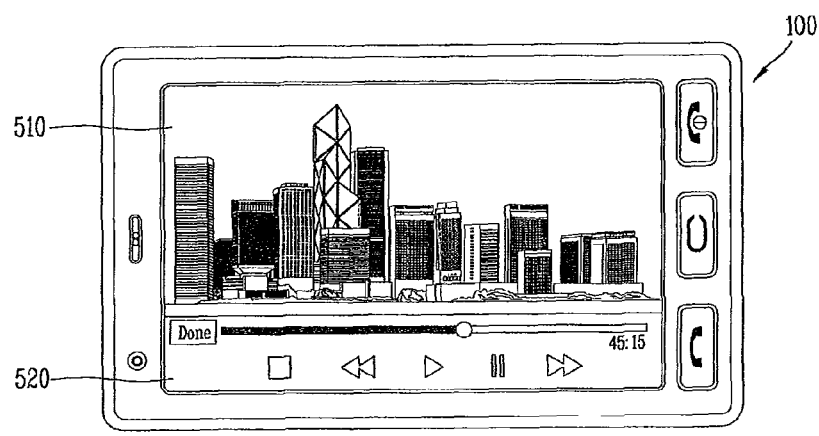
FIG. 5 is a view for describing the change of a delay time for screen lock execution in a content-based application according to a first embodiment of the present disclosure.

FIG. 5 is a view for describing the change of a delay time for screen lock execution in a content-based application according to a first embodiment of the present disclosure.

When an application being executed is a content-based application, the change controller 220 may change a delay time based on the reproduction information of content. For example, the content-based application may include video player, music player, photo viewer, and the like.

Referring to FIG. 5, for example, an application for playing content may be executed in the mobile terminal 100, and a content reproduction screen 510 may be displayed on the display unit 151. Furthermore, a reproduction control region 520 of content may be further displayed on the display unit 151 together with the content reproduction screen 510. The change controller 220 may check that the type of application being executed is a content-based application, and may check a delay time for the content-based application. Furthermore, the change controller 220 may change a delay time of screen lock execution by the execution controller 210 to the checked delay time.

Furthermore, in this case, the change controller 220 may change a delay time of screen lock execution by the execution controller 210 according to the reproduction information of content. For example, the change controller 220 may change a delay time to delay screen lock execution if the content is being reproduced, and change a delay time to advance screen lock execution if the content is not being reproduced.

Figure 6:
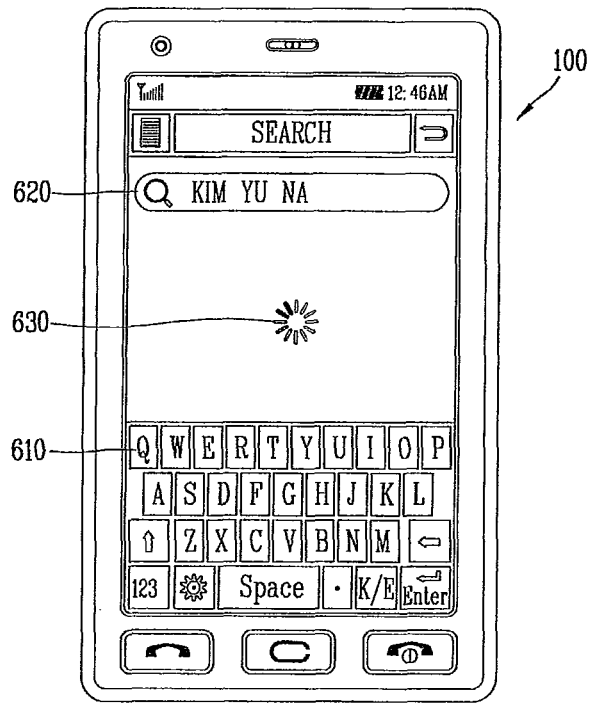
FIG. 6 is a view for describing the change of a delay time for screen lock execution in a search-based application according to a first embodiment of the present disclosure.

FIG. 6 is a view for describing the change of a delay time for screen lock execution in a search-based application according to a first embodiment of the present disclosure.

When an application being executed is a search-based application, the change controller 220 may change a delay time based on an input time or search time of search word. The search-based application may include web browser, phone book, file explorer, and the like.

Referring to FIG. 6, for example, an application for searching for information may be executed in the mobile terminal 100, and an information search screen may be displayed on the display unit 151. The information search screen may include a key input interface 610 and a search word display region 620. The change controller 220 may check that the type of application being executed is a search-based application, and check a delay time for the search-based application. Furthermore, the change controller 220 may change a delay time of screen lock execution by the execution controller 210 to the checked delay time.

Furthermore, in this case, the change controller 220 may change a delay time of screen lock execution by the execution controller 210 according to an input time or search time of search word. For example, the change controller 220 may change a delay time to a time in which the user's search word input time (for example, an average time consumed from an input start time of search word (an input time of the first letter (or, numeral or symbol) of search word) to an input end time (an input time of search command)) is added to the delay time. Furthermore, the change controller 220 may change a delay time to a time in which the information search time of an application (for example, an average time consumed from an search start time (an input time of search command) to an search end time (a display time of searched information)) is added to the delay time. An item 630 indicating that information is being searched may be further displayed on the display unit 151 during the information search of an application.

Figure 7:
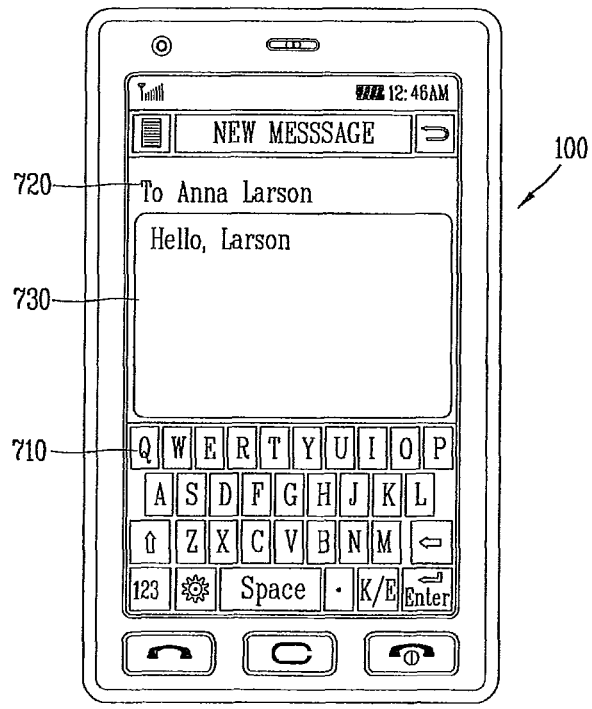
FIG. 7 is a view for describing the change of a delay time for screen lock execution in a messaging service-based application according to a first embodiment of the present disclosure.

FIG. 7 is a view for describing the change of a delay time for screen lock execution in a messaging service-based application according to a first embodiment of the present disclosure.

When an application being executed is a messaging service-based application, the change controller 220 may change a delay time based on an input time of message. The messaging service may be any one of a text message service, an instant message service, and an email service. Furthermore, the text message service may be any one of a short message service, a multimedia message service, and an enhanced message service.

Referring to FIG. 7, for example, an application for writing a message is executed in the mobile terminal 100, and a message preparation screen may be displayed on the display unit 151. The message preparation screen may include a key input interface 710, a receiver information display region 720, and a message content display region 730. The change controller 220 may check that the type of application being executed is a messaging service-based application, and check a delay time for the messaging service-based application. Furthermore, the change controller 220 may change a delay time of screen lock execution by the execution controller 210 to the checked delay time.

Furthermore, in this case, the change controller 220 may change a delay time of screen lock execution by the execution controller 210 according to an input time of message. For example, the change controller 220 may change a delay time to a time in which the user's search word input time (for example, an average time consumed from the user's input start time of message content (an input time of the first letter (or, numeral or symbol) of message content) to an input end time (an input time of message content input complete command or message transmission command)) is added to the delay time.

Figure 8:
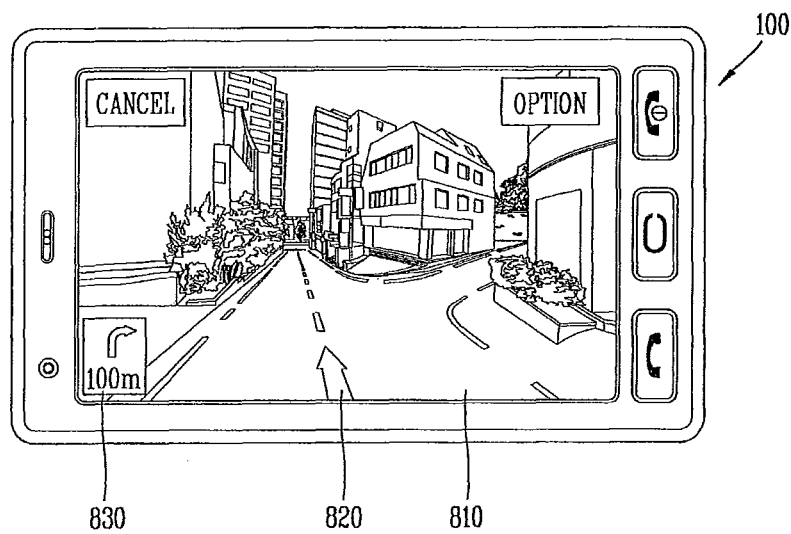
FIG. 8 is a view for describing the change of a delay time for screen lock execution in a location information-based application according to a first embodiment of the present disclosure.

FIG. 8 is a view for describing the change of a delay time for screen lock execution in a location information-based application according to a first embodiment of the present disclosure.

When an application being executed is a location information-based application, the change controller 220 may change a delay time based on a change of location information. The location information-based application may include navigation (road guide), traffic information, map application, and the like.

Referring to FIG. 8, for example, an application for displaying road guide information may be executed in the mobile terminal 100, and a display screen of road guide information may be displayed on the display unit 151. The display screen of road guide information may further include a map information display region 810, a road guide information display region 820, and a turn information display region 830. The change controller 220 may check that the type of application being executed is a location information-based application, and may check a delay time for the location information-based application. Furthermore, the change controller 220 may change a delay time of screen lock execution by the execution controller 210 to the checked delay time.

Furthermore, in this case, the change controller 220 may change a delay time of screen lock execution by the execution controller 210 according to a change of location information. For example, the change controller 220 may change a delay time to delay screen lock execution if the location information is being changed, and change a delay time to advance screen lock execution if the location information is not being changed.

Figure 9:
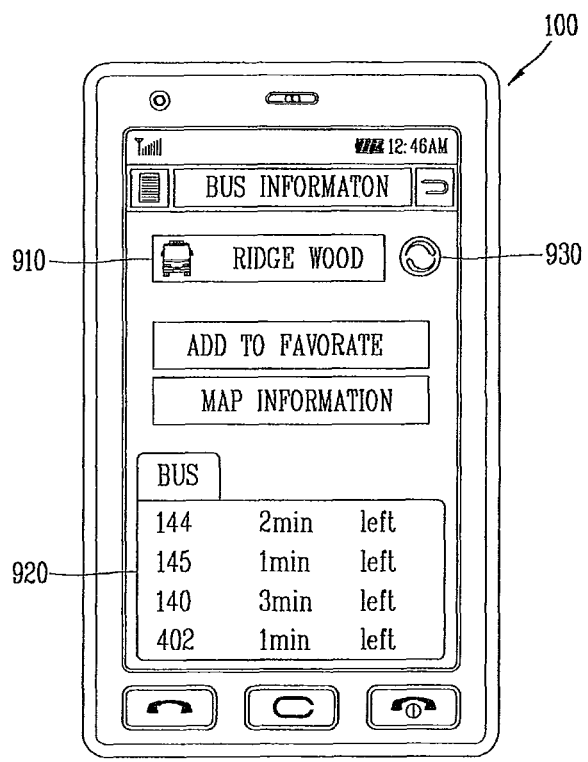
FIG. 9 is a view for describing the change of a delay time for screen lock execution in a time information-based application according to a first embodiment of the present disclosure.

FIG. 9 is a view for describing the change of a delay time for screen lock execution in a time information-based application according to a first embodiment of the present disclosure.

When an application being executed is a time information-based application, the change controller 220 may change a delay time based on a change of time information. The time information-based application may include alarm, scheduler, traffic information, and the like.

Referring to FIG. 9, for example, an application for displaying traffic information may be executed in the mobile terminal 100, and a display screen of traffic information may be displayed on the display unit 151. The display screen of traffic information may further include a location display region 910, a traffic information display region 920, and a refresh menu display region 930. The change controller 220 may check that the type of application being executed is a time-based application, and may check a delay time for the time-based application. Furthermore, the change controller 220 may change a delay time of screen lock execution by the execution controller 210 to the checked delay time.

Furthermore, in this case, the change controller 220 may change a delay time of screen lock execution by the execution controller 210 according to a change of time information. For example, if information displayed on traffic information display region 920 is being changed according to time variation (i.e., if refreshed periodically), then the change controller 220 may change a delay time to delay screen lock execution. Furthermore, if information displayed on traffic information display region 920 is not being changed according to time variation, then the change controller 220 may change a delay time to advance screen lock execution.

Figure 10:
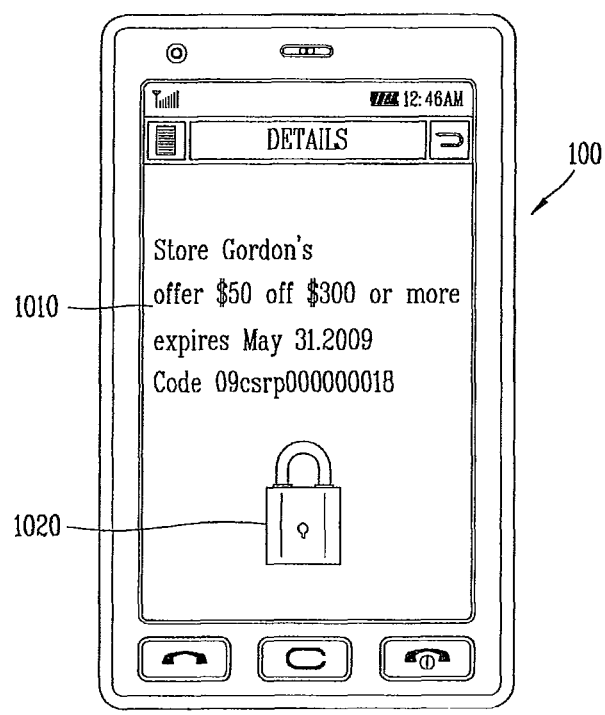
FIG. 10 is a view for describing the change of a delay time for screen lock execution in an application that can approach security set data according to a first embodiment of the present disclosure.

FIG. 10 is a view for describing the change of a delay time for screen lock execution in an application that can approach security set data according to a first embodiment of the present disclosure.

The change controller 220 may change a delay time based on security setting for an object being approached by an application. For example, the change controller 220 may check security setting for an object being approached by an application to change a delay time based on the security setting.

Referring to FIG. 10, for example, an application displaying an object 1010 (for example, content) is being executed, and the change controller 220 may change a delay time based on the type of application. The security setting for an object may include a public setting capable of immediately approaching an object without an authentication key and a non-public setting capable of approaching an object only by inputting an authentication key. If security setting for an object being approached by an application is non-public, the extension of a delay time may be restricted, but only the reduction of a delay time may be allowed. Accordingly, it may be possible to prevent worry of harming the security of an object due to the extension of a delay time to an object with a non-public setting.

Figure 11:
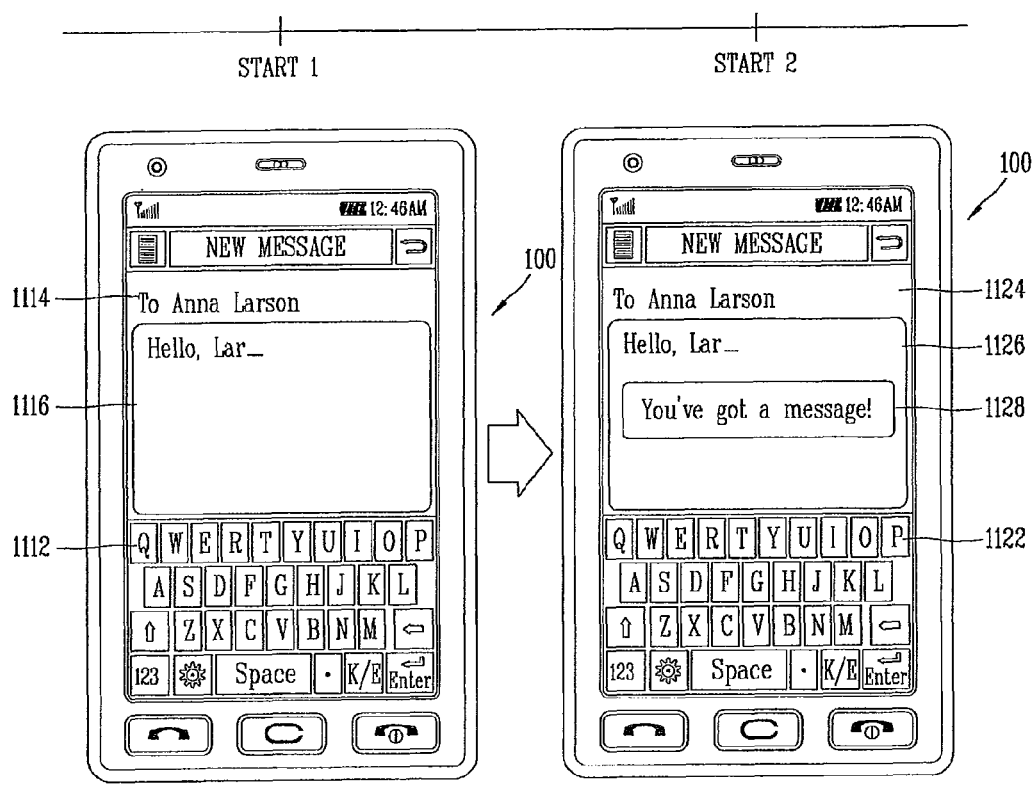
FIG. 11 is a view for describing the change of a delay time for screen lock execution in an application by which an interrupt has been generated according to a first embodiment of the present disclosure.

FIG. 11 is a view for describing the change of a delay time for screen lock execution in an application by which an interrupt has been generated according to a first embodiment of the present disclosure.

The change controller 220 may change a delay time based on an interrupt generated by an application. The change controller 220 may monitor the generation of an interrupt such as notification of a message arrival event in the application to change a start time of the delay time to an interrupt generation time when an interrupt has been generated. The execution controller 210 may count a delay time of screen lock execution again from the changed start time of the delay time.

Referring to FIG. 11, for example, an application for writing a message is executed in the mobile terminal 100, and a message writing screen may be displayed on the display unit 151. The message writing screen may include a key input interface 1112, 1122, a receiver information display region 1114, 1124, and a message content display region 1116, 1126. A start time of the delay time of screen lock execution by the execution controller 210 may be START1 that has received the last input. For example, if the notification of a message arrival event is generated in the application, then a message arrival event 1128 may be displayed on the screen. In this case, the change controller 220 may change the start time of the delay time of screen lock execution to START2, which is a time at which the notification of a message arrival event has been generated. The execution controller 210 may count the delay time of screen lock execution again from START2.

Figure 12:
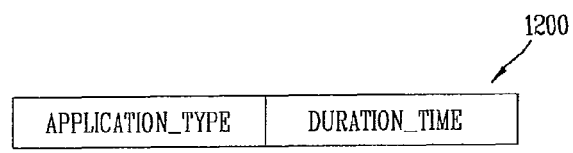
FIG. 12 is a view illustrating the structure of a delay time information table according to a type of application according to a first embodiment of the present disclosure.

FIG. 12 is a view illustrating the structure of a delay time information table according to a type of application according to a first embodiment of the present disclosure.

A delay time information table 1200 according to a first embodiment of the present disclosure may include an application type field (APPLICATION_TYPE) and a delay time field (DURATION_TIME). The application type field may include information on the type of application divided by a function provided by the application. The delay time field may include information on a delay time of screen lock execution by the execution controller 210 according to the type of application. According to an embodiment, a reference delay time for which screen lock is executed by the execution controller 210 may be T, and a delay time of screen lock execution for an application not included in the application type field may be T.

Figure 13:
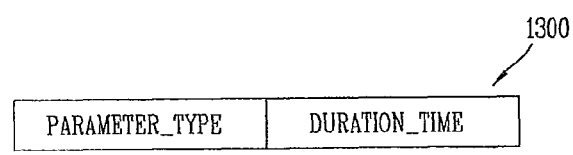
FIG. 13 is a view illustrating the structure of a delay time information table according to a type of parameter according to a first embodiment of the present disclosure.

FIG. 13 is a view illustrating the structure of a delay time information table according to a type of parameter according to a first embodiment of the present disclosure.

A delay time information table 1300 according to a first embodiment of the present disclosure may include an parameter type field (PARAMETER_TYPE) and a delay time field (DURATION_TIME). The parameter type field may include information on the type of application divided by a different function provided by the same application. The parameter type may be information on parameters associated with a function provided by the application such as reproduction information of content, an input or search time of search word, an input time of message, a change of location information, a change of time information, or the like. The delay time field may include information on a delay time of screen lock execution by the execution controller 210 according to the type of parameter.

Figure 14:
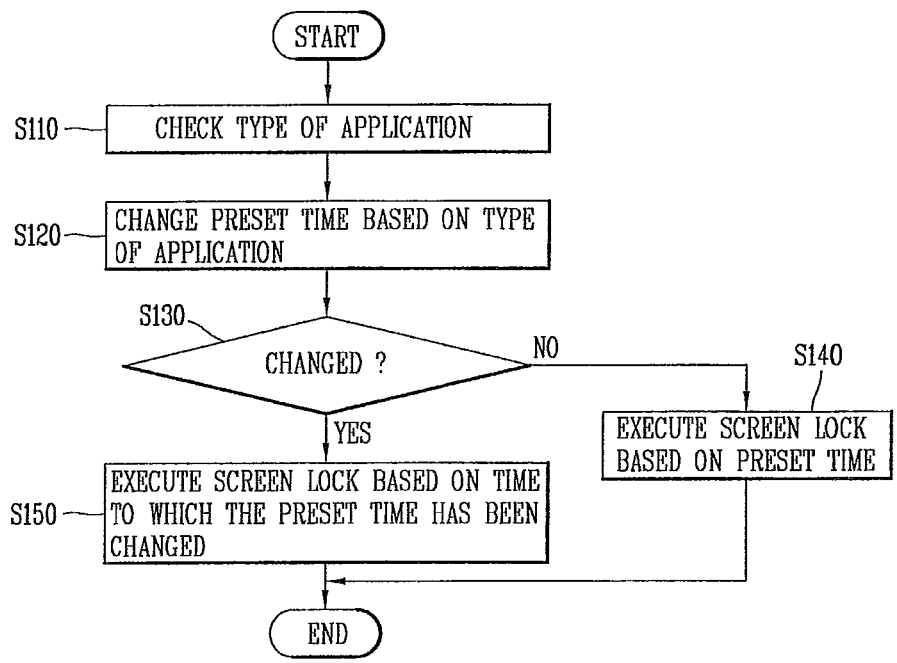
FIG. 14 is a flow chart illustrating the process of changing a delay time for screen lock execution according to a first embodiment of the present disclosure.

FIG. 14 is a flow chart illustrating the process of changing a delay time for screen lock execution according to a first embodiment of the present disclosure.

If an application is executed, for example, then the change controller 220 may check the executed type of application (S110). The type of application may be checked from the registration information of an application stored in the mobile terminal 100 and managed by an operating system. Otherwise, the type of application may be checked from the registration information of an application stored in the mobile terminal 100 and independently managed by an operating system.

Furthermore, the change controller 220 may change a delay time based on the checked type of application (S120). In this case, the change controller 220 may reduce or extend a delay time based on the checked type of application.

Furthermore, the execution controller 210 may check whether the delay time has been changed (S130), and execute screen lock if a user input is not received for the delay time when the delay time has not been changed (S140). If a user input is not received for the changed delay time when the delay time has been changed, then the execution controller 210 may execute screen lock for the changed delay time (S150).

Figure 15:
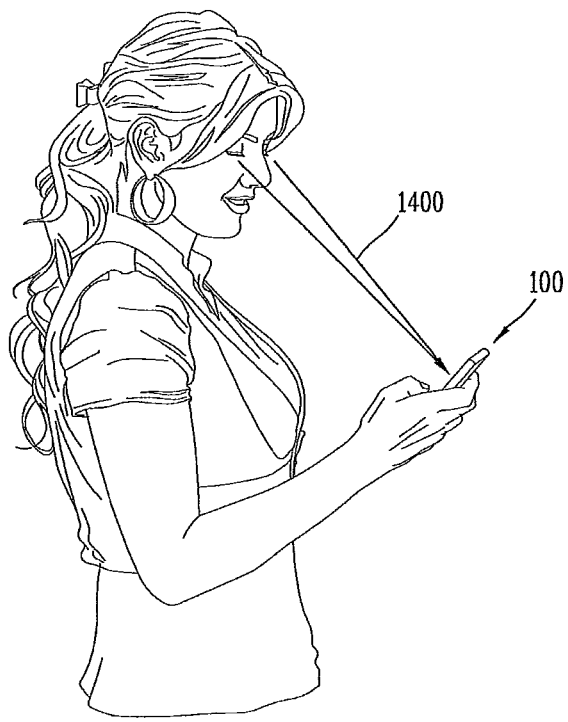
FIG. 15 is a conceptual view for describing user's gaze information according to a second embodiment of the present disclosure.

FIG. 15 is a conceptual view for describing user's gaze information according to a second embodiment of the present disclosure.

The change controller 220 may change a delay time based on the display unit 151 detected through the sensing unit 140 or the user's gaze information on visual information displayed on the display unit 151. The change controller 220 may reduce or extend a delay time based on user's gaze information. Furthermore, the change controller 220 may determine whether to stare at the display unit 151 or visual information displayed on the display unit 151 or a stare time at the display unit 151 or visual information displayed on the display unit 151 based on the user's gaze information, and change a delay time based on whether to stare or the stare time.

Referring to FIG. 15, for example, visual information may be displayed on the display unit 151 of the mobile terminal 100, and the user may apply a user input to the mobile terminal 100 or check visual information displayed on the mobile terminal 100. In this case, the change controller 220 may check the user's gaze information 1400, namely, information on a line connecting a user's eye to the display unit 151 or visual information displayed on the display unit 151. Furthermore, the change controller 220 may determine whether the user stares at the display unit 151 or visual information displayed on the display unit 151 based on the gaze information. Furthermore, the change controller 220 may determine the user's stare time at the display unit 151 or visual information displayed on the display unit 151 based on the gaze information. The change controller 220 may change a delay time based on whether the user stares at the display unit 151 or visual information displayed on the display unit 151 or the stare time at the display unit 151 or visual information displayed on the display unit 151.

For example, if it is determined that the user stares at the display unit 151 or visual information displayed on the display unit 151, then the change controller 220 may change a delay time to delay screen lock execution by the execution controller 210. If it is determined that the user does not stare at the display unit 151 or visual information displayed on the display unit 151, then the change controller 220 may change a delay time to advance screen lock execution by the execution controller 210.

Furthermore, for example, if it is determined that the user gazes at the display unit 151 or visual information displayed on the display unit 151 for more than a threshold time, then the change controller 220 changes a delay time to delay screen lock execution by the execution controller 210. Furthermore, if it is determined that the user gazes at the display unit 151 or visual information displayed on the display unit 151 for less than a threshold time, then the change controller 220 may not change a delay time.

Figure 16:
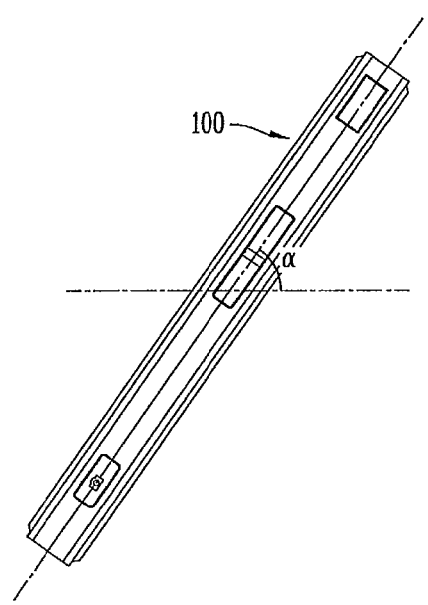
FIG. 16 is a view for describing the change of a delay time for screen lock execution based on a tilt pattern according to a second embodiment of the present disclosure.

FIG. 16 is a view for describing the change of a delay time for screen lock execution based on a tilt pattern according to a second embodiment of the present disclosure.

The user's gaze information may include information on tilt of the mobile terminal 100. In this case, the sensing unit 140 may include at least one acceleration sensor, and if the tilt of the mobile terminal 100 is detected by the sensing unit 140, then the change controller 220 may check whether there is the user' gaze or a gaze time based on, for example, a prestored tilt pattern when the user executes an application or releases screen lock.

Referring to FIG. 16, for example, if the tilt of the mobile terminal 100 is measured as $\alpha$ by the sensing unit 140 with reference to the central axis, then the change controller 220 may determine whether $\alpha$ is included in a prestored tilt pattern. If $\alpha$ is included in the prestored tilt pattern, then the change controller 220 may change a delay time. For example, the change controller 220 may change a delay time of screen lock execution by the execution controller 210, or change a start time of the screen lock execution delay time to a time at which a tilt has been detected by the sensing unit 140.

Figure 17:
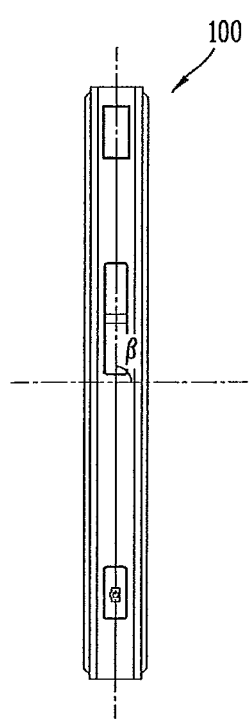
FIG. 17 is a view for describing the change of a delay time for screen lock execution based on a tilt pattern according to a second embodiment of the present disclosure.

FIG. 17 is a view for describing the change of a delay time for screen lock execution based on a tilt pattern according to a second embodiment of the present disclosure.

Referring to FIG. 17, for example, if the tilt of the mobile terminal 100 is measured as $\beta$ by the sensing unit 140 with reference to the central axis, then the change controller 220 may determine whether $\beta$ is included in a prestored tilt pattern. If $\beta$ is included in the prestored tilt pattern, then the change controller 220 may change a delay time. Here, the angle $\alpha$ of FIG. 16 and the angle $\beta$ of FIG. 17 are different, but both the angles $\alpha$ and $\beta$ may be included in the tilt pattern since there may be a plurality of tilt patterns. For example, tilt patterns may be different from each other when the user sits on a chair to use the mobile terminal 100 and when the user lays down on a bed to use the mobile terminal 100.

Figure 18:
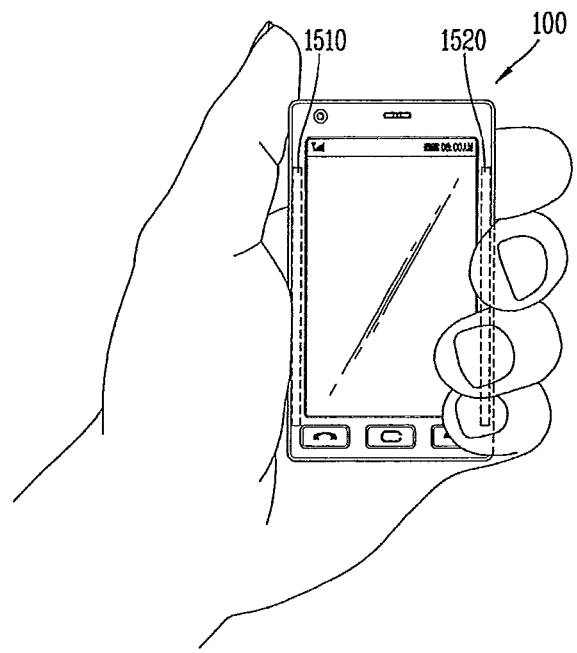
FIG. 18 is a view for describing the change of a delay time for screen lock execution based on a grip pattern according to a second embodiment of the present disclosure.

FIG. 18 is a view for describing the change of a delay time for screen lock execution based on a grip pattern according to a second embodiment of the present disclosure.

The user's gaze information may include information on the user's grip type of the mobile terminal 100. In this case, the sensing unit 140 may include a touch sensor, and if a grip type is detected by the sensing unit 140, then the change controller 220 may check whether there is the user' gaze or a gaze time based on, for example, a prestored grip pattern when the user executes an application or releases screen lock.

Referring to FIG. 18, for example, the sensing unit 140 may include a plurality of lateral surface touch sensors 1510, 1520, and each lateral surface touch sensor may be configured with a plurality of cells capable of accommodating one touch input. The sensing unit 140 may detect a combination of touch inputs applied to a plurality of cells included in each lateral surface touch sensor. The change controller 220 may compare the detected combination of touch inputs with a prestored grip type pattern, and change a delay time when a combination of touch inputs detected by the sensing unit 140 is included in the prestored grip type pattern. For example, the change controller 220 may change a delay time of screen lock execution by the execution controller 210, or change a start time of the screen lock execution delay time to a time at which a tilt has been detected by the sensing unit 140.

On the other hand, according to an embodiment of the present disclosure, the user's gaze information may include information on tilt of the mobile terminal 100 and information on the user's grip type of the mobile terminal 100. In this case, the change controller 220 may change a delay time based on information on the tilt of the mobile terminal 100 and information on the user's grip type of the mobile terminal 100.

Figure 19:
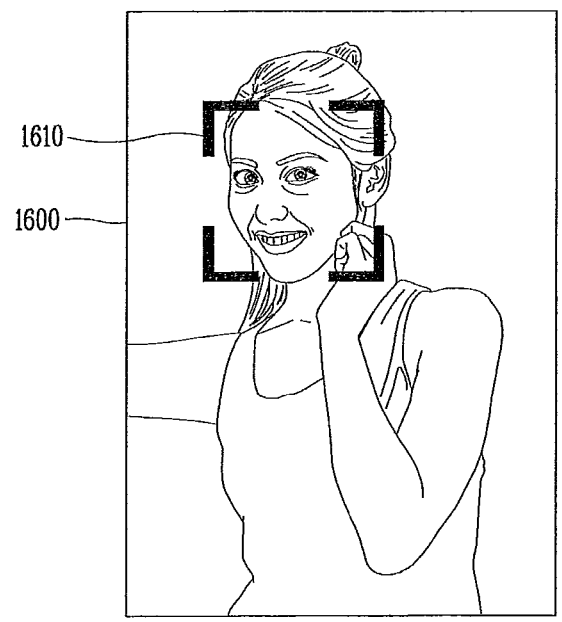
FIG. 19 is a view for describing the change of a delay time for screen lock execution based on a face region detection according to a second embodiment of the present disclosure.

FIG. 19 is a view for describing the change of a delay time for screen lock execution based on a face region detection according to a second embodiment of the present disclosure.

The user's gaze information may include information on whether the user's face region is detected on an image in which the user has been captured. The change controller 220 may capture the user through an optical sensor included in the camera 121 or sensing unit 140. In this case, the optical sensor included in the camera 121 or sensing unit 140 may be provided on the same surface as the surface provided with the display unit 151. The change controller 220 may capture the user through an optical sensor included in the camera 121 or sensing unit 140 to acquire a captured image. Furthermore, the change controller 220 may detect the user's face region from the captured image through an edge extraction, pattern extraction, or the like to determine the user's gaze information based on the detected face region.

Referring to FIG. 19, for example, the change controller 220 may acquire an image 1600 in which the user has been captured through an optical sensor included in the camera 121 or sensing unit 140. Furthermore, the change controller 220 may detect a face region 1610 from the image 1600 in which the user has been captured to determine the user's gaze information according to whether the face region has been detected or a size of the detected face region.

For example, if a size of the face region 1610 detected from the image 1600 in which the user has been captured is larger than a threshold value, then the change controller 220 may determine that the user gazes at the display unit 151 or visual information displayed on the display unit 151. According to the embodied example, the change controller 220 may detect an eye's shape or pupil's shape even in the user's face region, and determine whether the user gazes at the display unit 151 or visual information displayed on the display unit 151 according to a state of eyes open or closed, a direction of gaze, or the like.

FIG. 20 is a view illustrating the structure of a delay time information table according to gaze information according to a second embodiment of the present disclosure.

Figure 20A:
FIGS. 20A-20C are views illustrating the structure of a delay time information table according to gaze information according to a second embodiment of the present disclosure.

FIG. 20A is a view illustrating the structure of a delay time information table according to a second embodiment of the present disclosure. Referring to FIG. 20A, the delay time information table may include a tilt pattern field (ANGLE_PATTERN) and a delay time field (DURATION_TIME). The tilt pattern field may include information on a tilt pattern of the mobile terminal 100 in a situation requiring the user's gaze at visual information when the user executes an application or releases screen lock. The tilt pattern may be a set of predetermined tilt. Furthermore, the change controller 220 may collect tilt information according to the user's pattern of using the mobile terminal 100 to generate or change a tilt pattern. The delay time field may include information on a delay time of screen lock execution by the execution controller 210 according to a tilt pattern. According to an embodiment, a reference delay time for which screen lock is carried out by the execution controller 210 may be T, and a delay time of screen lock execution for the tilt not included in the tilt pattern field may be T.

Figure 20B:

FIG. 20B is a view illustrating the structure of a delay time information table according to a second embodiment of the present disclosure. Referring to FIG. 20B, the delay time information table may include a grip type pattern field (GRIP_TYPE_PATTERN) and a delay time field (DURATION_TIME). The grip type pattern field may include information on a grip type pattern of the mobile terminal 100 in a situation requiring the user's gaze at visual information when the user executes an application or releases screen lock. The grip type pattern may be a set of predetermined grip types. Furthermore, the change controller 220 may collect grip types according to the user's pattern of using the mobile terminal 100 to generate or change a grip type pattern. The delay time field may include information on a delay time of screen lock execution by the execution controller 210 according to a grip type pattern. According to an embodiment, a reference delay time for which screen lock is carried out by the execution controller 210 may be T, and a delay time of screen lock execution for the grip type not included in the grip type pattern field may be T.

Figure 20C:
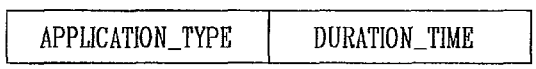

FIG. 20C is a view illustrating the structure of a delay time information table according to a second embodiment of the present disclosure. The delay time information table may include an application type field (APPLICATION_TYPE) and a delay time field (DURATION_TIME). The application type field may include information on an application type of the mobile terminal 100 divided according to whether an application requires the user's stare at visual information. The change controller 220 may change a delay time based on the type of application displaying visual information. The delay time field may include information on a delay time of screen lock execution by the execution controller 210 according to a application type. According to an embodiment, a reference delay time for which screen lock is carried out by the execution controller 210 may be T, and a delay time of screen lock execution may be larger than T if the type of application is an application requiring the user's stare at visual information, and the delay time of screen lock execution may be less than T if the type of application is an application not requiring the user's stare at visual information.

Figure 21:
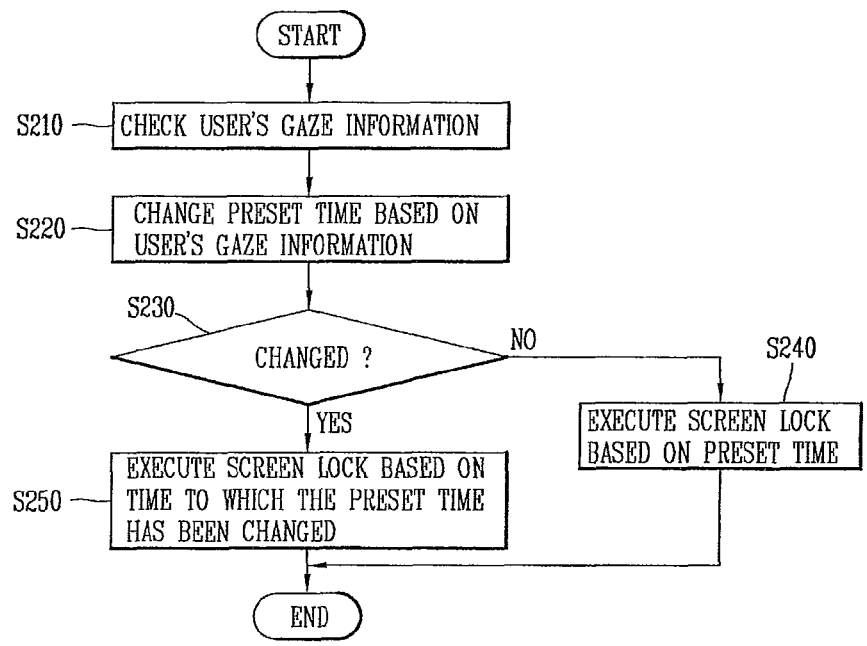
FIG. 21 is a flow chart illustrating the process of changing a delay time for screen lock execution according to a second embodiment of the present disclosure.

FIG. 21 is a flow chart illustrating the process of changing a delay time for screen lock execution according to a second embodiment of the present disclosure.

The change controller 220 may check the user's gaze information at the display unit 151 or visual information displayed on the display unit 151 (S210). The change controller 220 may check gaze information including tilt of the mobile terminal 100, a user's grip type for the mobile terminal 100, or whether a face region is detected on an image in which the user has been captured.

Furthermore, the change controller 220 may change a delay time based on the checked gaze information (S220). In this case, the change controller 220 may reduce or extend a delay time based on the gaze information.

Furthermore, the execution controller 210 may check whether the delay time has been changed (S230), and execute screen lock if a user input is not received for the delay time when the delay time has not been changed (S240). If a user input is not received for the changed delay time when the delay time has been changed, then the execution controller 210 may execute screen lock for the changed delay time (S250).

According to an embodiment of the present disclosure, the mobile terminal recognizes the user's expected operation or status to dynamically control an interrupt of an input or display that can be generated at an interface, thereby providing a user-friendly interface environment. Accordingly, the utilization of a screen lock function may be maximized, and particularly, the use for various applications provided by the mobile terminal may be also maximized, and a battery may be effectively managed, thereby providing an advantage of enhancing the use of the mobile terminal.

A mobile terminal disclosed herein may include all kinds of terminals capable of transmitting and receiving a text message, such as a portable phone, a smart phone, a laptop computer, a digital broadcast terminal, a personal digital assistant (PDA), a portable multimedia player (PMP), a navigation, and the like. The configurations and methods according to the above-described embodiments will not be applicable in a limited way, and all or part of each embodiment may be selectively combined and configured to make various modifications thereto.

Here, the terms and words used herein and the claims should not be construed by limiting to their typical or lexical meaning, but should be construed based on the meaning and concept conforming to the technical spirit of the present invention. Accordingly, the configuration illustrated in the embodiments disclosed herein and the drawings is merely one embodiment of the present invention, and is not intended to represent all the technical spirit of the present invention, and thereby it should be appreciated that there may exist various equivalents and modifications for substituting those at the time of filing this application.

The invention claimed is:

1. A mobile terminal, comprising:
    a touch screen configured to display visual information;
    a camera unit configured to detect a user's gaze information; and
    a controller configured to:
    execute an application in response to a user input, wherein an execution screen of the application is displayed on the touch screen,
    detect the user's gaze information, and
    stop displaying the execution screen of the application based on an elapsed time from when the user's gaze information is not detected,
    wherein the elapsed time is varied based on a type of the application, the elapsed time is a first time when the application is a first application, and the elapsed time is a second time when the application is a second application, and
    wherein the first application is a content-based application including a video player and the second application is another application different from the content-based application including the video player.

2. The mobile terminal of claim 1, wherein the mobile terminal displays a preset screen when the display of the execution screen of the application is stopped based on the elapsed time from when the user's gaze information is not detected.

3. The mobile terminal of claim 2, wherein the preset screen is a black screen.

4. The mobile terminal of claim 1, wherein the touch screen is changed to a power saving mode when the display of the execution screen of the application is stopped.

5. The mobile terminal of claim 1, wherein the second application is a messaging service-based application including a text messaging application.

6. The mobile terminal of claim 5, wherein the first time of the first application is longer than the second time of the second application.

7. The mobile terminal of claim 1, wherein the first time of the first application is longer than the second time of the second application.

8. The mobile terminal of claim 1, wherein the controller is further configured to detect an eye's shape, and determine whether the user's gaze information is detected or not according to a state of eyes open or closed, and a direction of gaze.

9. The mobile terminal of claim 1, wherein the elapsed time is further changeable depending on a type of parameter.

10. The mobile terminal of claim 9, wherein the type of parameter comprises information on type of application divided by a different function provided by the same application.

11. The mobile terminal of claim 10, wherein the type of parameter identifies whether or not the video player is playing.

12. The mobile terminal of claim 1, wherein the second application is a search-based application including a web browsing application.

13. A method of controlling a mobile terminal, the method comprising:
    executing an application in response to a user input;
    displaying an execution screen of the application on a touch screen;
    detecting, through a camera unit, a user's gaze information; and
    stopping a display of the execution screen of the application based on an elapsed time from when the user's gaze information is not detected,
    wherein the elapsed time is varied based on a type of the application, the elapsed time is a first time when the application is a first application, and the elapsed time is a second time when the application is a second application, and
    wherein the first application is a content-based application including a video player and the second application is another application different from the content-based application including the video player.

14. The method of claim 13, wherein the mobile terminal displays a preset screen when the display of the execution screen of the application is stopped based on the elapsed time from when the user's gaze information is not detected.

15. The method of claim 14, wherein the preset screen is a black screen.

16. The method of claim 13, wherein the touch screen is changed to a power saving mode when the display of the application is stopped.

17. The method of claim 13, wherein the second application is a messaging service-based application including a text messaging application.

18. The method of claim 17, wherein the first time of the first application is longer than the second time of the second application.

19. The method of claim 13, wherein the first time of the first application is longer than the second time of the second application.

20. The method of claim 13, the method further comprising:
    detecting an eye's shape; and
    determining whether the user's gaze information is detected or not according to a state of eyes open or closed, and a direction of gaze.

21. The method of claim 13, wherein the elapsed time is further changeable depending on a type of parameter.

22. The method of claim 21, wherein the type of parameter comprises information on the type of application divided by a different function provided by the same application.

23. The method of claim 22, wherein the type of parameter identifies whether or not the video player is playing.

24. The method of claim 13, wherein the second application is a search-based application including a web browsing application.

* * * * *